(12) United States Patent
Hosoda et al.

(10) Patent No.: US 7,056,028 B2
(45) Date of Patent: *Jun. 6, 2006

(54) COMBINATION SEAL RING WITH ENCODER

(75) Inventors: Masahiro Hosoda, Fujisawa (JP); Yuji Nakamura, Fujisawa (JP)

(73) Assignee: NSK Ltd., Tokyo (JP)

(*) Notice: Subject to any disclaimer, the term of this patent is extended or adjusted under 35 U.S.C. 154(b) by 84 days.

This patent is subject to a terminal disclaimer.

(21) Appl. No.: 10/647,538

(22) Filed: Aug. 26, 2003

(65) Prior Publication Data

US 2004/0036226 A1    Feb. 26, 2004

Related U.S. Application Data

(63) Continuation of application No. 09/541,697, filed on Apr. 3, 2000, now Pat. No. 6,682,076.

(30) Foreign Application Priority Data

Apr. 2, 1999 (JP) ................................. 11-96669

(51) Int. Cl.
*F16C 33/76* (2006.01)
(52) U.S. Cl. .................. 384/486; 384/482; 277/551; 277/572
(58) Field of Classification Search ................ 277/551, 277/572, 576; 384/477, 480, 481, 482, 484, 384/486
See application file for complete search history.

(56) References Cited

U.S. PATENT DOCUMENTS

| 658,124 A | 9/1900 | Semple |
|---|---|---|
| 664,814 A | 12/1900 | Manes |
| 751,090 A | 2/1904 | Marold |
| 967,664 A | 8/1910 | Peterson |
| 1,565,392 A | 12/1925 | Powers |
| 2,412,895 A | 12/1946 | Lewis |
| 2,585,089 A | 2/1952 | Caldwell et al. |
| 3,896,527 A | 7/1975 | Miller et al. |
| 4,387,490 A | 6/1983 | Blackburn et al. |

(Continued)

FOREIGN PATENT DOCUMENTS

DE    3837261    5/1990

(Continued)

OTHER PUBLICATIONS

Snugz USA Product Catalog, Jan. 1997.

(Continued)

*Primary Examiner*—Vishal Patel
(74) *Attorney, Agent, or Firm*—Crowell & Moring LLP

(57) ABSTRACT

A combination seal ring with an encoder for use to close off the opening of the space between a fixed ring and a rotational ring and to detect a rotational speed of the rotational ring, comprising a seal ring secured to the fixed ring, a metal slinger secured to the rotational ring, and an encoder of a rubber magnet secured to the slinger, the seal ring comprising a metal core secured to the fixed ring, and a fixed ring portion bent toward the rotational ring from the fixed cylindrical portion; and a resilient member bonded all around the metal core, the slinger comprising a rotational cylindrical portion secured to the rotational ring, and a rotational ring portion bent toward the fixed ring from the rotational cylindrical portion, the encoder bonded on the rotational circular ring portion, opposite to the seal lips by a molding process, the end rim of the encoder being short at least 0.2 mm of the end rim of the rotational circular ring portion.

2 Claims, 5 Drawing Sheets

U.S. PATENT DOCUMENTS

| | | | |
|---|---|---|---|
| 4,441,677 A | 4/1984 | Byerly | |
| 4,586,499 A | 5/1986 | Kaletzky | |
| 4,692,970 A | 9/1987 | Anthony et al. | |
| 4,795,069 A | 1/1989 | Ferrill | |
| 4,948,277 A * | 8/1990 | Alff | 384/448 |
| 5,027,477 A | 7/1991 | Seron | |
| 5,121,865 A | 6/1992 | Howard | |
| 5,127,137 A | 7/1992 | Krauss | |
| 5,136,756 A | 8/1992 | Krauss | |
| 5,143,458 A | 9/1992 | Alff et al. | |
| 5,216,786 A | 6/1993 | Anscher | |
| 5,274,887 A | 1/1994 | Fudaki | |
| 5,365,642 A | 11/1994 | Rekuc et al. | |
| 5,414,903 A | 5/1995 | Porteous | |
| 5,431,413 A | 7/1995 | Hajzler | |
| 5,454,647 A * | 10/1995 | Otto | 384/486 |
| 5,458,420 A * | 10/1995 | Otto | 384/448 |
| 5,475,901 A | 12/1995 | Anscher | |
| 5,530,344 A * | 6/1996 | Caillaut et al. | 324/174 |
| 5,561,891 A | 10/1996 | Hsieh | |
| 5,582,337 A | 12/1996 | McPherson et al. | |
| 5,611,545 A * | 3/1997 | Nicot | 277/2 |
| 5,669,119 A | 9/1997 | Seron | |
| 5,689,860 A | 11/1997 | Matoda et al. | |
| 5,842,256 A | 12/1998 | Anscher | |
| 5,855,057 A | 1/1999 | Anscher | |
| D405,723 S | 2/1999 | Anscher | |
| D405,724 S | 2/1999 | Anscher | |
| D405,725 S | 2/1999 | Anscher | |
| 5,893,199 A | 4/1999 | Anscher | |
| 5,933,925 A | 8/1999 | Anscher et al. | |
| 5,947,611 A | 9/1999 | Nagase | |
| 5,974,637 A | 11/1999 | Tracy et al. | |
| D422,142 S | 4/2000 | Hicks et al. | |
| 6,065,879 A * | 5/2000 | Mitsue et al. | 384/448 |
| D426,063 S | 6/2000 | Hicks et al. | |
| 6,170,992 B1 * | 1/2001 | Angelo et al. | 277/551 |
| 6,250,811 B1 * | 6/2001 | Mizukoshi et al. | 384/448 |

FOREIGN PATENT DOCUMENTS

| | | |
|---|---|---|
| FR | 2 660 975 | 10/1991 |
| FR | 2660975 | 10/1991 |
| FR | 2 740 186 | 4/1997 |
| FR | 2740186 | 4/1997 |
| GB | 891022 | 3/1962 |
| JP | 64-21219 | 1/1989 |
| JP | 6421219 | 1/1989 |
| JP | 2528784 | 8/1991 |
| JP | 0 495 323 | 7/1992 |
| JP | 0495323 | 7/1992 |
| JP | 5-26233 | 2/1993 |
| JP | 526233 | 2/1993 |
| JP | 5-238369 | 9/1993 |
| JP | 5238369 | 9/1993 |
| JP | 6-281018 | 10/1994 |
| JP | 6281018 | 10/1994 |
| JP | 9-274051 | 10/1997 |
| JP | 9274051 | 10/1997 |
| JP | 11-44702 | 2/1999 |
| JP | 1144702 | 2/1999 |

OTHER PUBLICATIONS

Snugz USA Product Catalog, Jan. 1999.
Snugz USA Product Catalog, Jan. 2000.
Fields 2000 Collection Eyewear and Outdoor Accessories & Gifts, available on information and belief, Jan. 2000.
U.S. Appl. No. 60/088,262, filed Jun. 5, 1998, Hicks et al.
U.S. Appl. No. 29/105,931, filed Jun. 4, 1999, Hicks et al.
Notice of Allowance for U.S. Appl. No. 29/105,931, filed Jun. 4, 1999, Hicks et al.
U.S. Appl. No. 29/105,930, filed Jun. 4, 1999, Hicks et al.
U.S. Appl. No. 29/105,930, filed Jun. 9, 1999, Hicks et al.
U.S. Appl. No. 29/106,139, filed Jun, 9, 1999, Hicks et al.
U.S. Appl. No. 29/106,139, filed Jun. 9, 1999, Hicks et al.
SNUGZ USA, Inc. Website, Dated Oct. 3, 2000.
EK Ekcessories, Inc. Website, Dated Apr. 4, 2000.
Photographs (taken Oct., 2000) of lanyard, on information and belief, sold after Jun. 1998, and prior to Mar. 31 2000, with attachment member selectively coupled thereto.

* cited by examiner

COMBINATION SEAL RING WITH ENCODER

This is a continuation of a application Ser. No. 09/541,697 filed on Apr. 3, 2000, now U.S. Pat. No. 6,682,076.

FIELD OF THE INVENTION

The present invention relates to a combination seal ring with an encoder, more particularly a combination seal which is incorporated into a rolling bearing unit for rotationally supporting road wheels of a vehicle relative to a suspension unit, to thereby seal the rolling bearing unit, and is also utilized for detecting the rotational speed of wheels supported by the rolling bearing unit.

BACKGROUND OF THE INVENTION

A rolling bearing unit fitted with an encoder as described in, for example, Japanese Unexamined Patent Publication No. TokuKaiSho 64-21219 has heretofore been known, to rotatably support wheels of a vehicle relative to a suspension unit as well as to detect the rotational speed of the wheels in order to control an anti-lock brake system (ABS) or a traction control system (TCS).

Moreover, a structure in which an encoder is fitted in a part of a seal ring, which is used for closing an opening at an end portion of the rolling bearing unit, has heretofore been known, as described in, for example, Japanese Unexamined Patent Publications Nos. TokuKaiHei 5-26233, 5-238369, 6-281018, 9-274051 and 11-44702, and European Patent Publication EP 495 323 A1.

When detection of the rotational speed of the wheels is performed magnetically, encoders in which the magnetic property changes alternately in the circumferential direction (generally, at even intervals) are used. In order that the magnetic property changes alternately in the circumferential direction in such encoders, a plurality of removed portions and solid portions are alternately formed in the circumferential direction on a magnetic material, or a permanent magnet in which S poles and N poles are arranged alternately is used.

Among these, the encoder made of a permanent magnet is recently increasing in use from the point that the structure on the sensor side is easily made up, and that is maintains detection accuracy at low speeds.

In the case of the combination seal ring fitted with an encoder that is heretofore known, for example, from the description in the above mentioned publications, it has been difficult to incorporate the seal ring into a small rolling bearing unit in a condition where this does not protrude from the end face of a race of the rolling bearing unit, while ensuring sufficient sealing property, and also ensuring a sufficiently large output, regardless of slight fitting errors.

SUMMARY OF THE INVENTION

An objective of the present invention is to provide, taking the above situation into consideration, a combination seal ring with an encoder which is used between a fixed ring and a rotational ring for closing off an opening at an end portion of a space existing between a circumferential face of the fixed ring and a circumferential face of the rotational ring, and also for detecting the rotational speed of the rotational ring.

DETAILED DESCRIPTION OF THE PREFERRED EMBODIMENTS

Figure 1:
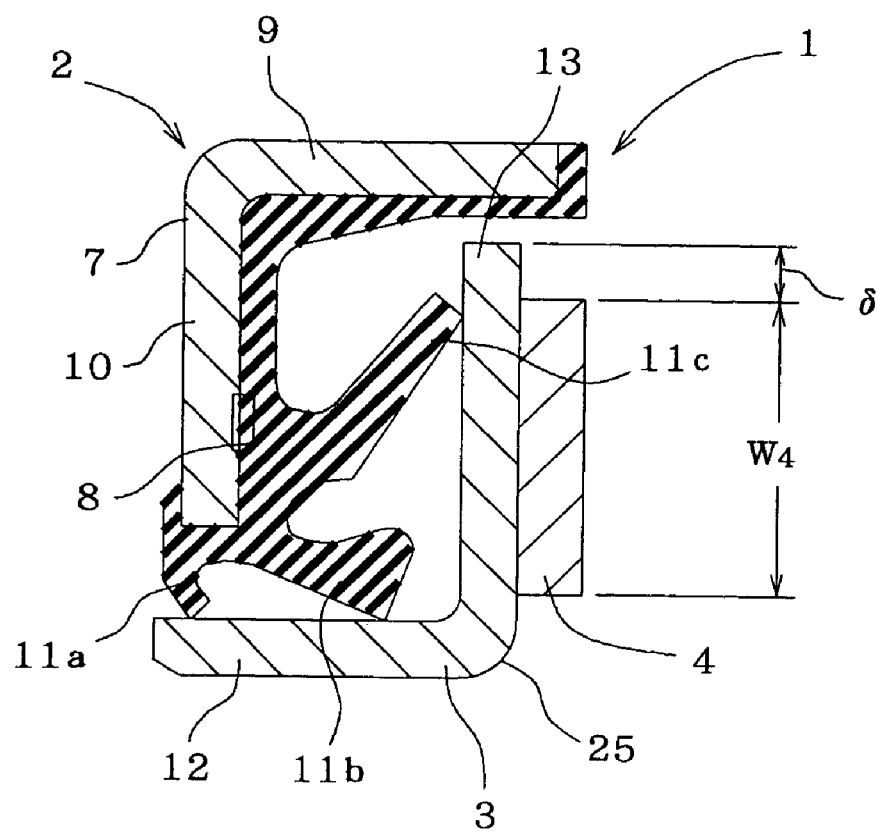
FIG. 1 is an enlarged, cross sectional end view of a first example of the embodiments of the combination seal ring with an encoder according to the present invention.

The combination seal ring with an encoder of the present invention, where a combination seal ring is fitted with an encoder, is provided for use between a fixed ring and a rotational ring to close off the opening at one end of the space between the fixed ring and the rotational ring, and essentially comprises a seal ring secured to the circumferential face of the fixed ring, a slinger made of metal and secured to the circumferential face of the rotational ring, and an encoder supported by and secured to the slinger.

The seal ring comprises: a metal core consisting of a fixed by cylindrical portion which is fitted and secured to the circumferential face of the fixed ring, and a fixed circular ring portion bent toward the circumferential face of the rotational ring from one end rim of the fixed cylindrical portion; and a resilient member having at least one seal lip, which is bonded all around the metal core.

Moreover, the slinger comprises a rotational cylindrical portion which is fitted and secured to the circumferential face of the rotational ring, and a rotational circular ring portion bent toward the circumferential face of the fixed ring from the end rim of the rotational cylindrical portion; and does not comprise a resilient member. The rotational circular ring portion has a first side face and second side face axially opposite to each other.

The slinger has at least a portion on the circumferential face of the rotational cylindrical portion and on the first side face of the rotational circular ring portion, against which the respective end rim of the at least one seal lip is rubbed. This portion is made in a smooth surface.

Furthermore, the encoder is made of a rubber magnet in which S poles and N poles are alternately arranged in the circumferential direction, and is bonded and supported on the second side face of the rotational circular ring portion, which is opposite to the seal lip. This encoder is attached to the rotational circular ring portion by a molding process, wherein this second side face surface is utilized for molding.

In a case of the combination seal ring fitted with the encoder, the end rim of the encoder exists in a position depressed by 0.2 mm or more from the end rim of the rotational circular ring portion, in the diametrical direction, while in another case of the combination seal ring fitted with an encoder, a part of the end rim of the encoder covers the end rim of the rotational circular ring portion so as to be connected to the end rim of the rotational circular ring portion.

The operation of sealing between the circumferential face of the fixed ring and the circumferential face of the rotational ring by the combination seal ring with an encoder of the present invention constituted as described above, the preventing ingress of foreign matter into the space between both those circumferential faces, while preventing grease filled into the space from leaking outside, is similar to the operation of the combination seal ring fitted with an encoder heretofore known as described in the aforementioned publications or the like.

Particularly, in the case of the combination seal ring fitted with an encoder of the present invention, sufficient sealing property can be ensured and also a sufficiently large output can be ensured regardless of slight fitting errors, while incorporating the seal ring into a small rolling bearing unit in a condition where this does not protrude from the end face of a race of the rolling bearing unit.

Now some examples of the present invention are detailed referring the attached drawings.

Figure 2:
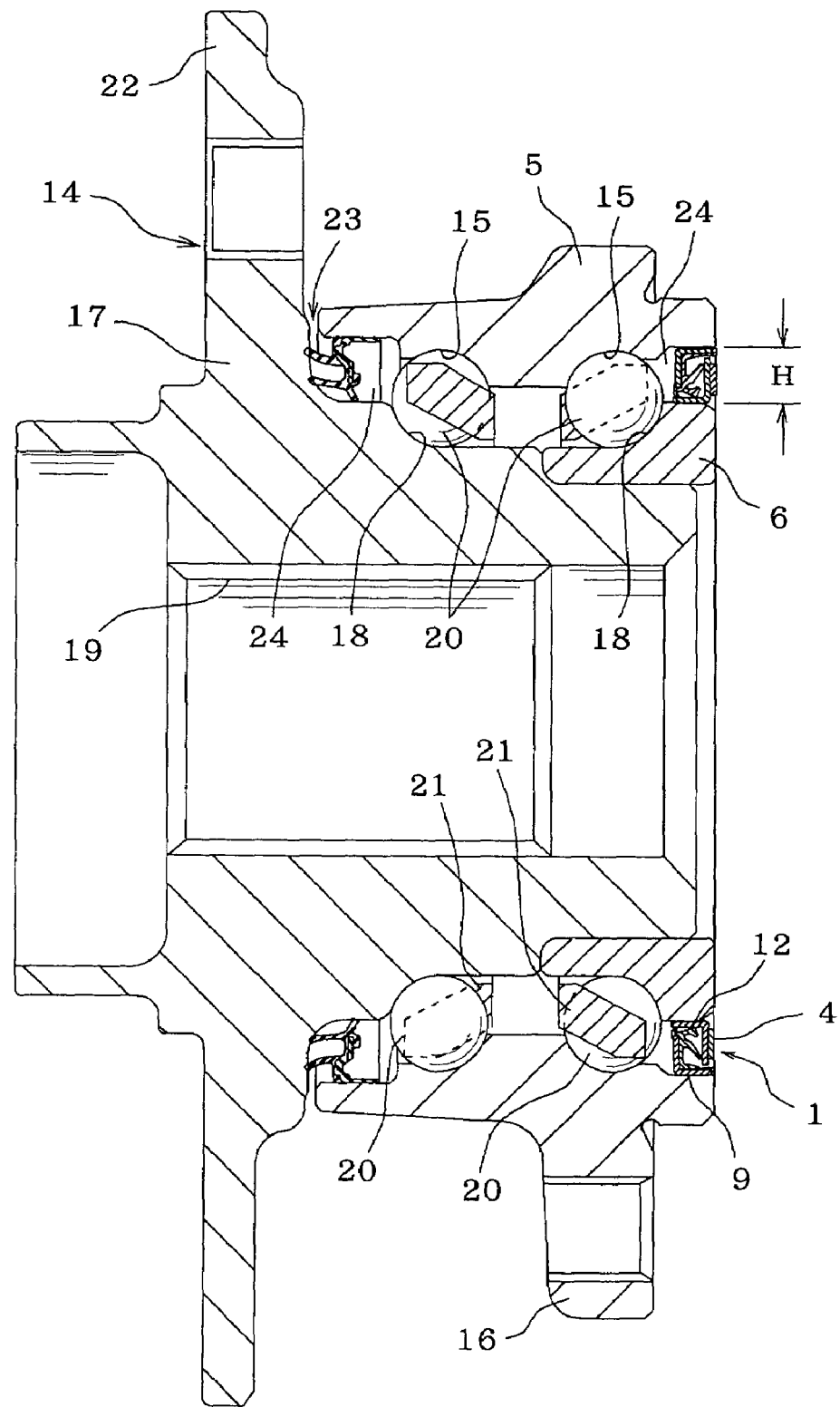
FIG. 2 is a cross sectional view of a rolling bearing unit in which the first example of the embodiments of the combination seal ring with an encoder according to the present invention is incorporated.

FIG. 1 and FIG. 2 show a first example of an embodiment of the present invention. First, a combination seal ring 1 fitted with an encoder will be described.

There is a combination seal ring 1 with an encoder, which is provided between an outer ring 5 which is a fixed ring (FIG. 2) and an inner ring 6 which is a rotational ring (FIG. 2) described later, specifically at one end portion thereof.

The combination seal ring 1 with an encoder comprises a seal ring 2 internally fitted and secured to one end portion of the outer ring 5, a slinger 3 made of a magnetic metal plate such as a steel plate or a stainless steel plate and externally fitted and secured to one end portion of the inner ring 6, and an encoder 4 supported and secured by the slinger 3.

The seal ring 2 consists of a metal core 7 formed in an overall annular shape to give an L-shape in cross-section, and a resilient member 8.

The metal core 7 is formed in an overall annular shape to give an L-shape in cross-section using a metal plate such as a low carbon steel plate or the like, and has a fixed cylindrical portion 9 which is internally fitted and secured to the inner circumferential face of the fixed ring or outer ring 5 by interference fit, and a fixed circular ring portion 10 bent in the diametrically inward direction from an axial end rim of the fixed cylindrical portion 9 toward the outer circumferential face of the inner ring 6.

Moreover, the resilient member 8 is bonded over the whole periphery of the metal core 7, and has three seal lips 11a to 11c. In general, the resilient member 8 is made of rubber, and is connected to the metal core 7 by thermal bonding. In a case, a single seal lip may be sufficient.

Moreover, the slinger 3 comprises a rotational cylindrical portion 12 which is externally fitted and secured to the outer circumferential face at one end portion of the inner ring 6 by interference fit, and a rotational circular ring portion 13 bent in the diametrically outward direction from an end rim of the rotational cylindrical portion 12 toward the inner circumferential face of the outer ring 5. The rotational circular ring portion 13 has first and second side faces.

The seal lips 11a to 11c come into contact with the rotational cylindrical portion 12 and the first side face of the rotational circular ring portion 13.

This slinger 3 does not comprise a resilient member, and has a smooth surface portion on the outer circumferential face of the rotational cylindrical portion 12 and on one side of the rotational ring portion 13, so that the end rims of the seal lips 11a to 11c are rubbed against the smooth surface portion, respectively.

The encoder 4 is made of a rubber magnet in which S poles and N poles are alternately arranged in the circumferential direction. That is to say, the encoder 4 is made from a rubber magnet with a ferrite powder incorporated in the rubber, and formed in a circular ring shape, and magnetized in the axial direction(in the left and right direction in FIG. 1).

The magnetized direction is changed alternately in the circumferential direction at even intervals. Therefore, on one side of the encoder 4, S poles and N poles are arranged alternately in the circumferential direction at even intervals. Such an encoder 4 is bonded and supported on the second side face of the rotational circular ring portion 13, opposite to the respective seal lips 11a to 11c.

The encoder is made by a molding process wherein a rubber material incorporated with a ferrite powder is molded by utilizing this second side face of the rotational circular ring portion 13.

The end rim on the outer circumference of the encoder 4 exists in a position depressed by $\delta$ in the diametrically inward direction from the end rim on the outer circumference of the rotational circular ring portion 13. In other words, the end rim of the encoder 4 is short of the end rim of the rotational circular ring portion 13. In the case of the present invention, the quantity $\delta$ by which the end rim on the outer circumference of the encoder 4 is depressed from the end rim on the outer circumference of the rotational circular ring portion 13 is made to be 0.2 mm or more but as small as possible (close to 0.2 mm, for example, not larger than 0.4 mm).

This is to prevent the rubber material from going around to the opposite side of the rotational circular ring portion 13 from the end rim on the outer circumference of the rotational circular ring portion 13, when the slinger 3 is set in a mold for molding the encoder 4 and the rubber material is injected into the mold. That is to say, in this way the portion, which is rubbed by the end rim of the seal lip 11c at a portion towards the outside diameter on the opposite side face of the rotational circular ring portion 13, can be maintained as a smooth face (so that the rubber material does not adhere to the rubbed portion).

However, the depressed quantity $\delta$ is suppressed as small as possible, and the radially inner circumferential rim position of the encoder 4 is located in the diametrically inward direction as much as possible, to thereby ensure the width dimension $W_4$ in the diametrical direction of the encoder 4.

Therefore, in the case of this example, the inner circumferential rim of the encoder 4 is located in a position on the outside diameter of a curved portion 25 having a one-quarter circular are shape in cross section, which makes the rotational circular ring portion 13 and the rotational cylindrical portion 12 continuous (in a position where the outer circumferential rim of the curved portion 25 and the inner circumferential rim of the rotational circular ring portion 13 are continuous).

Now, FIG. 2 shows a rolling bearing unit 14, for example, in which the combination seal ring 1 fitted with an encoder constituted as described above is incorporated, so that the rotational speed of wheels rotatably supported by the rolling bearing unit 14 relative to a suspension unit can be freely detected.

The rolling bearing unit 14 shown in FIG. 2 is for supporting driven wheels (rear wheels of FR vehicles and RR vehicles, front wheels of FF vehicles, and all wheels of 4WD vehicles) relative to the suspension unit.

The fixed ring or outer ring 5 of such a rolling bearing unit 14 has outer ring raceways 15 in double row on the inner circumferential face. Moreover, an attachment portion 16 in an outward flange form is provided for supporting and securing the outer ring 5 relative to the suspension unit, in a middle part on the outer circumferential face of the outer ring 5.

Furthermore, the inner ring 6 is attached to a hub 17 which is arranged concentrically with the outer ring 5 on the inside thereof. The hub 17 and the inner ring 6 are combined to constitute a rotational ring.

There are formed inner ring raceways 18 on the outer circumferential face of the hub 17 and the inner ring 6, respectively, facing the outer ring raceways 15.

Also a spline hole 19 is formed in the center of the hub 17. Into the spline hole 19 is inserted a spline shaft attached to a constant velocity joint, not illustrated, when fitted to the vehicle.

Then, the hub 17 and the inner ring 6 are clamped axially between an end face of a housing provided in the constant velocity joint and a nut screwed onto the end portion of the spline shaft opposite to the constant velocity joint.

The opening of the hub 17 at the nut portion is closed off by fitting a closure, not illustrated, thereto, after the nut has been screwed and tightened.

Moreover, a flange 22 for supporting road wheels is provided on a portion of the hub 17 protruding from the opening of the outer ring 5 opposite to the constant velocity joint. Specifically the flange 22 extends from a portion on the axially outer side of the hub 17 (the term "axially outer side" means a portion which becomes outside in the axial direction, when fitted to the vehicle, and left side in the FIG. 2). A road wheel, not illustrated, is coupled and secured to the flange 22 by a stud, not illustrated, fixedly provided in the flange 22. Therefore, the hub 17 rotates with the road wheels, as the vehicle runs.

Moreover, a plurality of balls 20 serving as rolling elements are provided for each row between the outer ring raceways 15 and the inner ring raceways 18. These balls 20 are retained so as to be freely rotatable by retainers 21, in the state that they are separated from each other in the circumferential direction. Therefore, the hub 17 is supported rotatably on the radially inside of the outer ring 5.

Incidentally, when a rolling bearing unit for vehicles in which the weight increase, taper rollers may be used instead of using balls 20 as the rolling bodies.

Moreover, a seal ring 23 is internally fitted and secured to the end portion of the outer ring 5 on the axially outer side thereof, and the end rim of a seal lip of the seal ring 23 is rubbed against and brought into contact with the outer circumferential face in the middle part of the hub 17, to thereby close off the opening at the end on the axially outer side of the space 24 existing between the outer circumferential faces of the hub 17 and the inner ring 6 and the inner circumferential face of the outer ring 5.

The combination seal ring 1 fitted with an encoder constituted as described above is provided at the end portion of the axially inner side of the rolling bearing unit 14 constituted as described above and fitted between the inner circumferential face of the end portion of the axially inner side of the outer ring 5 and the outer circumferential face of the end portion on the axially inner side of the inner ring 6, in the state closing off the opening at the end on the axially inner side of the space 24 (the term "axially inner side" means a portion which becomes inside in the axial direction, when fitted to the vehicle, and right side in the FIG. 2).

That is to say, the fixed cylindrical portion 9 is internally fitted and secured by interference fit to the end portion on the axially inner side of the outer ring 5, and the rotational cylindrical portion 12 is externally fitted and secured by interference fit to the end portion on the axially inner side of the inner ring 6.

Moreover, in this state, the end rim of the respective seal 11a, 11b and 11c are rubbed against the outer circumferential face of the rotational cylindrical portion 12 and the radially outside face of the rotational circular ring portion 13, over the whole circumference.

Also, a detection portion of a sensor, not illustrated, supported by fixed portions such as the outer ring 5 or a part of the suspension unit is opposed to the face on the axially inner side of the encoder 4, via a small gap.

In the case of the combination seal ring 1 with an encoder of the present invention constituted as described above and fitted to the rolling bearing unit 14 in the manner described above, since the position of the outer circumferential rim of the encoder 4 is located in the diametrically outward direction as much as possible, and the position of the inner circumferential rim thereof is located in the diametrically inward direction as much as possible, the width dimension $W_4$ in the diametrical direction of the encoder 4 can be made large. Hence, it is possible to increase the output of the sensor facing the face on the axially inner side of the encoder 4 to thereby improve the detection reliability of the rotational speed of wheel, or reduce the production cost of the signal processing circuit.

Moreover, in the case of this example, since the end rim on the outer circumference side of the encoder 4 is depressed slightly in the diametrically inward direction from, in other words, short of, the end rim on the outer circumference side of the rotational ring portion 13, this can prevent the rubber material constituting the encoder 4 from going around from the end rim on the outer circumference of the rotational circular ring portion 13 to the opposite side face or first side face of the rotational circular ring portion 13. Hence, the portion rubbed by the end rim of the seal lip 11c at a portion towards the outside diameter on the opposite side face or first side face of the rotational circular ring portion 13, can be maintained as a smooth face, to thereby ensure the sealing property.

Figure 3:
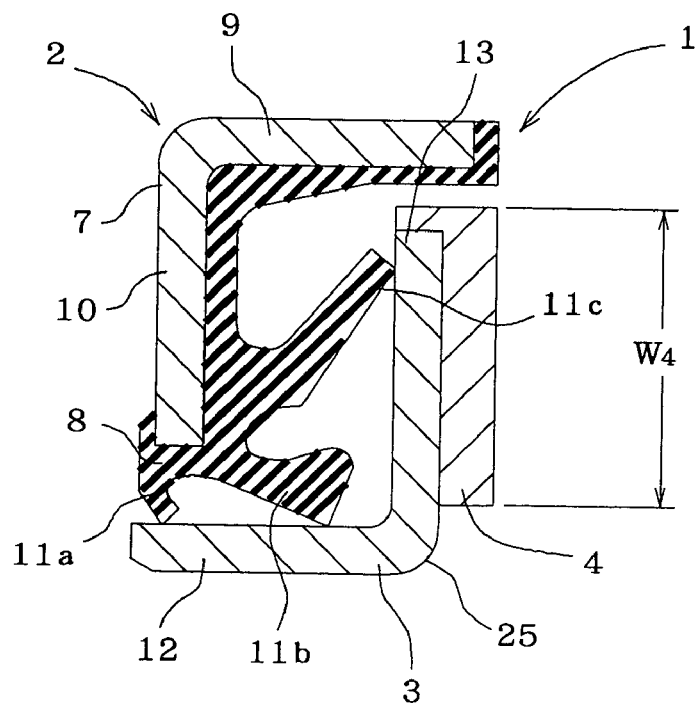
FIG. 3 is an enlarged, cross sectional end view of a second example of the embodiments of the combination seal ring with an encoder according to the present invention.

FIG. 3 shows a second example of an embodiment of the present invention. In the case of this example, the outside diameter of the encoder 4 is made slightly larger than the outside diameter of the slinger 3. Moreover, the outer circumferential rim portion of the encoder 4 is extended to the outer circumferential rim portion of the slinger 3, and both outer circumferential rim portions are connected to each other.

In the case of such a construction of this example, the width dimension $W_4$ in the diametrical direction of the encoder 4 is made larger, enabling an increase in the output of the sensor facing the face on the axially inner side of the encoder 4. Moreover, the area for bonding the encoder 4 and the slinger 3 can be increased to thereby improve the strength of bonding the encoder 4 to the slinger 3.

In the case of this example, if the encoder 4 is formed by molding a rubber material with a ferrite powder incorporated therein, wherein a part of the surface of the slinger 3 is utilized for molding, there is a possibility that the rubber material may adhere to the first side face of the rotational circular ring portion 13 of the slinger 3. To avoid this, when the structure of this example is prepared, a pre-formed encoder 4 may be bonded to the slinger 3.

Figure 4:
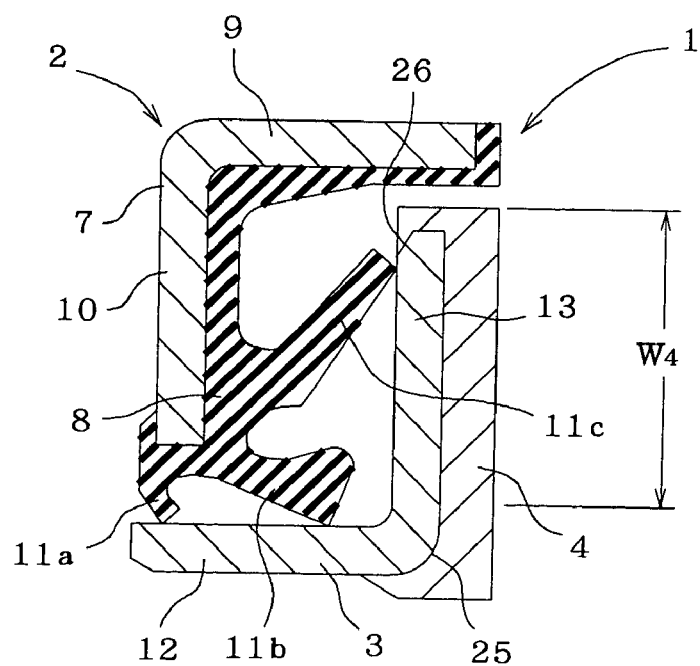
FIG. 4 is an enlarged, cross sectional end view of a third example of the embodiments of the combination seal ring with an encoder according to the present invention.

FIG. 4 shows a third example of an embodiment of the present invention. In the case of this example, a chamfer 26 is formed on the first side face at the outer circumferential rim portion of the rotational circular ring portion 13 of the slinger 3, to thereby form the outer circumferential rim portion of the rotational circular ring portion 13 in a wedge form.

Moreover, the outer circumferential rim portion of the encoder 4 is extended over the outer circumferential rim of the slinger 3 up to the chamfer 26, and the inner circumferential rim portion of the encoder 4 is extended up to a curved portion 25 of the slinger 3.

In the case of such a construction of this example, the width dimension $W_4$ in the diametrical direction of the encoder 4 can be further increased and the bonding strength between the encoder 4 and the slinger 3 can be further improved.

Furthermore, when being fitted to the rolling bearing unit, the inner circumferential rim portion of the encoder 4 is resiliently compressed between the curved portion 25 and the outer circumference of the inner ring 6 (FIG. 2), to thereby seal the space between the outer circumference of the inner ring 6 and the inner circumference of the slinger 3.

When the present invention is implemented, the detection accuracy of the rotational speed can be ensured by making the size so as to largely obtain characteristic effects and by increasing the width dimension of the encoder. The reason for this will be described with reference to FIG. 4 and FIG. 5.

First, the sectional height of a seal portion where the combination seal ring 1 fitted with an encoder of the present invention is fitted, that is, a space H shown in FIG. 2 between the inner circumferential face at the end portion on the axially inner side of the outer ring 5 and the outer circumferential face at the end portion on the axially inner side of the inner ring 6 is 4 to 7 mm.

In the case of a relatively large rolling bearing unit in which the space or sectional height H exceeds 7 mm, the detection accuracy of the rotational speed can be ensured without relying upon the present invention.

On the contrary, when the space or sectional height H is less than 4 mm, even with the present invention, it becomes difficult to ensure the detection accuracy of the rotational speed.

Incidentally, the width dimension $W_4$ of the encoder 4 is assumed to be 50% or more of the above described space H ($W_4 \geq 0.5H$). When the condition of $W_4 \geq 0.5$ H is not satisfied, even if the present invention is applied, it is difficult to ensure the detection accuracy of the rotational speed. Moreover, it is necessary to ensure the width dimension $W_4$ of the encoder 4 to be 2.0 mm or more ($W_4 \geq 2.0$ mm).

The reason why the condition is $W_4 \geq 2.0$ mm will be described below.

Figure 5:
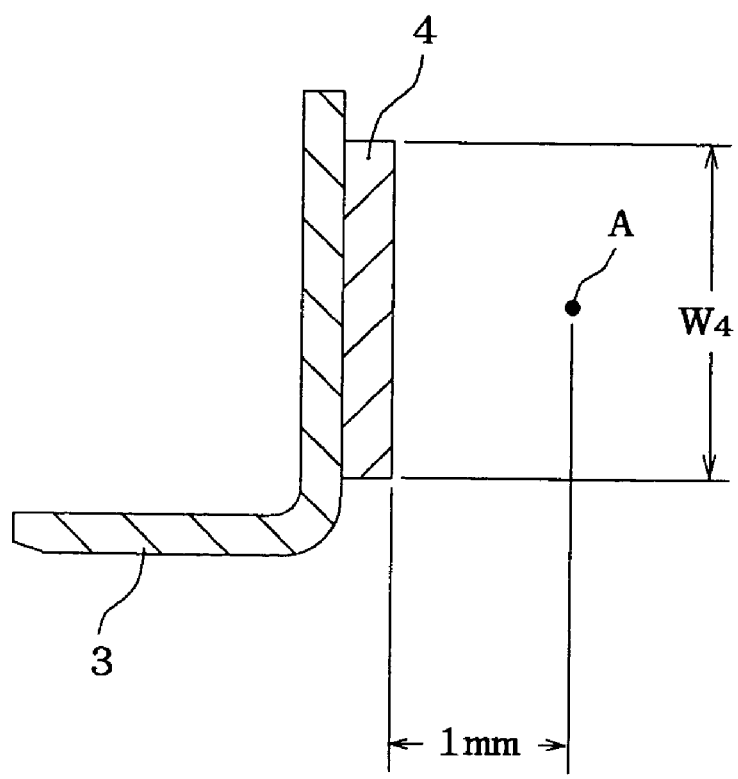
FIG. 5 is an enlarged, cross sectional end view of the slinger and encoder in the first example of the embodiments of the combination seal ring with an encoder according to the present invention for explanation on the measurement conditions of the magnetic flux density.

The present inventor prepared three kinds of encoders 4 having the width dimension $W_4$ of 3.75 mm, 2.8 mm and 2.0 mm, respectively, and measured the degree that the magnetic flux density changed at a position in the diametrical direction. That is to say, as shown in FIG. 5, the magnetic flux density in a pitch circle portion of each encoder 4, and at a position 1.0 mm away from the side face of each encoder 4 (a portion of point A in FIG. 5) is designated as 1, and changes in the magnetic flux density were measured with respect to respective cases, by changing the measurement position in the diametrical direction. The thickness of each encoder 4 was 0.8 mm, and the thickness of the slinger 3 made of a steel plate was 0.6 mm. The results are shown in FIG. 6.

Figure 6:
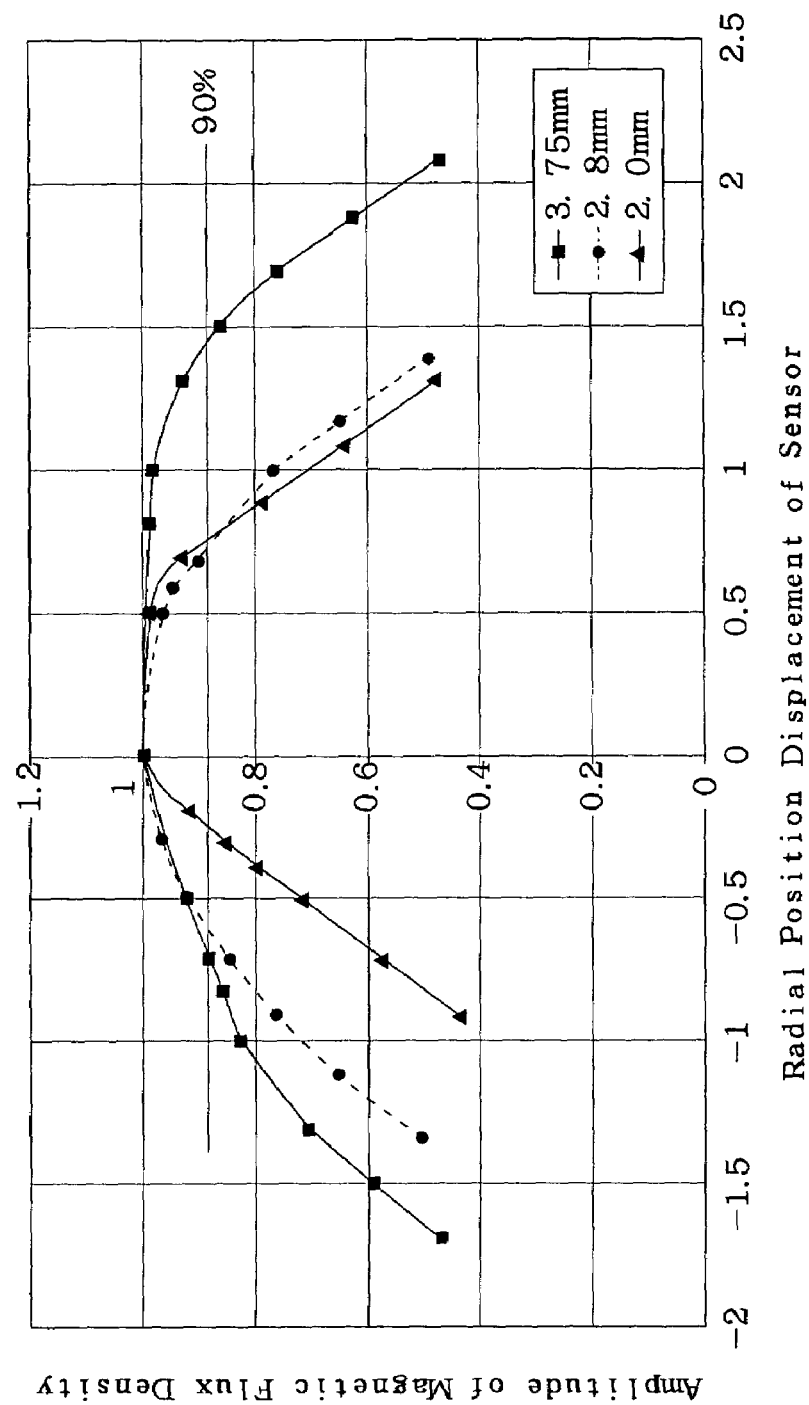
FIG. 6 is a graph to show a measurement result of the magnetic flux density.

As is clear from FIG. 6, the range in the diametrical direction that can ensure 90% or more of the magnetic flux density in the pitch circle portion is about 2.2 mm when the width dimension $W_4$ is 3.75 mm, about 1.4 mm when the width dimension $W_4$ is 2.8 mm, and about 1.0 mm when the width dimension $W_4$ is 2.0 mm. In the case where the detection accuracy of the rotational speed is maintained, it is necessary to make the sensor face a portion where the above described magnetic flux density exceeds 90% of the magnetic flux density in the pitch circle portion.

On the other hand, considering errors in the position of the sensor to be fitted relative to the encoder 4, the range becomes about 0.5 mm. That is to say, it is necessary to consider about 0.1 mm of discrepancy between the rotation center of the encoder 4 and the rotation center of the inner ring or rotational ring 6.

It is also necessary to consider about 0.1 mm of discrepancy between the outer ring 5 (FIG. 2) and a carrier fixed to the outer ring 5 for supporting the sensor.

Moreover, it is necessary to consider about 0.2 mm of discrepancy between the carrier and a holder for embedding and supporting the sensor. It is also necessary to consider about 0.1 mm of discrepancy between the holder and the sensor.

When all these discrepancies are added, the above described error in the position of the sensor to be fitted relative to the encoder 4 becomes about 0.5 mm as described above. The width dimension $W_4$ of the encoder 4 described above is required to be at least 2.0 mm, in order to ensure that the magnetic flux density detected by the sensor exceeds 90% of the magnetic flux density in the pitch circle portion, even if this discrepancy occurs in either direction of the inner diameter side or the outside diameter side.

As shown in FIGS. 1 and 2, in the case of a structure where the entire encoder 4 is bonded to and supported by the rotational circular ring portion 13, the thickness of the rubber magnet of the encoder 4 is not particularly limited. On the contrary, as shown in FIGS. 3 and 4, in the case of a structure where the outer circumferential rim portion of the encoders 4 is protruded from the outer circumferential rim of the slingers 3 in the diametrical direction, it is required that the thickness dimension of the rubber magnet of the encoders 4 is 0.2 to 1.0 mm.

If the thickness dimension is less than 0.2 mm, there is a possibility that local peeling may occur. On the contrary, if the thickness dimension exceeds 1.0 mm, there is a possibility that in a portion of the rubber magnet of the respective encoders 4 which protrudes diametrically from the slingers 3, the planar accuracy cannot be maintained so that this portion oscillates axially. In either case, there is a possibility that it is not possible to keep a distance constant between the side face of the encoders 4 and the sensor, and accurate detection of the rotational speed cannot be performed.

The combination seal ring fitted with an encoder of the present invention is constituted and operates as described above. Hence it has an excellent sealing property, and can improve detection accuracy of rotational speed by a rotational speed detection apparatus.

What is claimed is:

1. A bearing unit for an automobile, comprising a rotational ring and a fixed ring with a space of 4.0 mm to 7.0 mm therebetween and having a combination seal ring incorporated therein, and the combination seal ring being for use between the fixed ring having a circumferential face and the rotational ring having a circumferential face wherein a space exists between the circumferential face of the fixed ring and the circumferential face of the rotational ring and has an end portion with an opening, so as to close off the opening of the space and to detect a rotational speed of the rotational ring, the combination seal ring comprising:

a seal ring secured to the circumferential face of the fixed ring, a slinger made of magnetic metal and secured to the circumferential face of the rotational ring, and an encoder supported by and secured to the slinger, the seal ring comprising a metal core consisting of a fixed cylindrical portion which has an end rim and is fitted and secured to the circumferential face of the fixed ring, and a fixed circular ring portion bent toward the circumferential face of the rotational ring form the end rim of the fixed cylindrical portion, and a resilient member bonded around the metal core and having seal lips, the slinger comprising a rotational cylindrical portion which has an end rim and is fitted and secured to the circumferential face of the rotational ring, and a rotational circular ring portion which is bent toward the circumferential face of the fixed ring from the end rim of the rotational cylindrical portion, and the rotational circular ring portion having a first side face and second side face axially opposite to each other, the slinger having a smooth surface portion on the circumferential face of the rotational cylindrical portion and on the first side face of the rotational circular ring portion, respectively, against which the respective end rim of the seal lip is rubber, the encoder being made of a rubber magnet in which S poles and N poles are alternatively arranged in the circumferential direction, and bonded and supported on the second side face of the rotational circular ring portion, which is opposite to the seal lips, and the encoder bonded to rotational circular ring portion by a molding process, wherein this second side face is utilized for molding, and the encoder having a height in cross section of from 2.0 mm to 7.0 mm.

2. The bearing unit for an automobile according to claim 1, wherein the rotational circular ring portion of the slinger has an end rim and the encoder has an end rim wherein a part of the end rim of the encoder covers the end rim of the rotational circular ring portion of the slinger.

* * * * *